(12) United States Patent
Singvall

(10) Patent No.: US 6,898,239 B2
(45) Date of Patent: May 24, 2005

(54) METHOD OF DETECTING A SEQUENCE OF INFORMATION SYMBOLS, AND A MOBILE STATION ADAPTED TO PERFORMING THE METHOD

(75) Inventor: Jakob Singvall, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 764 days.

(21) Appl. No.: 09/761,358

(22) Filed: Jan. 16, 2001

(65) Prior Publication Data

US 2001/0009565 A1 Jul. 26, 2001

(30) Foreign Application Priority Data

Jan. 20, 2000 (EP) .............................................. 00610007

(51) Int. Cl.⁷ ................................................ H03H 7/30
(52) U.S. Cl. ........................ 375/233; 375/349; 708/323
(58) Field of Search ................................ 375/231, 232, 375/233, 346, 350, 349; 708/323; 714/795, 796

(56) References Cited

U.S. PATENT DOCUMENTS

| | | | |
|---|---|---|---|
| 5,455,844 A | * 10/1995 | Ishikawa et al. | 375/232 |
| 5,644,597 A | * 7/1997 | Ueda | 375/232 |
| 5,872,817 A | 2/1999 | Wei | 375/341 |
| 6,366,613 B2 | * 4/2002 | Sommer et al. | 375/232 |

OTHER PUBLICATIONS

Souvignier, T. et al., "Convolutional Coding for Parallel Decision–Feedback Equalization," IEEE 1998, XP–000801538, pp. 2712–2717.

Kerpez, K.J., "Viterbi Receivers in the Presence of Severe Intersymbol Interference," Globecom 90 ', IEEE Global Telecommunications Conference & Exhibition, San Diego, CA, Dec. 2–5, 1990, "Communications: Connecting the Future" Conf. Record vol. 3, XP 00218918, pp. 2009–2013.

Bergmans, W.M. et al., "Dual Decision Feedback Equalizer," IEEE Transactions on Communications, vol. 45, No. 5, May 1997, XP 000659443, pp. 514–518.

* cited by examiner

Primary Examiner—Young T. Tse
(74) Attorney, Agent, or Firm—Jenkens & Gilchrist, P.C.

(57) ABSTRACT

The invention relates to an apparatus and method of detecting a sequence of information symbols from a first signal subjected to inter-symbol interference. The method is performed as one or more signal processing paths are each being adapted to setting each symbol in the sequence to a value. When an uncertain decision has been taken in a given signal processing path, the signal processing path is divided into two. After setting a number of symbols, the sequence of information symbols is selected. The threshold used to determine whether a symbol is certain or not is adjusted in accordance with an estimate of the noise. The number of symbol errors when detecting a signal subjected to inter-symbol interference, e.g. in a mobile station, is reduced, and therefore the performance of the receiver is improved. Since unnecessary calculations are minimized, computational complexity is reduced which, in turn, reduces the power consumption.

12 Claims, 3 Drawing Sheets

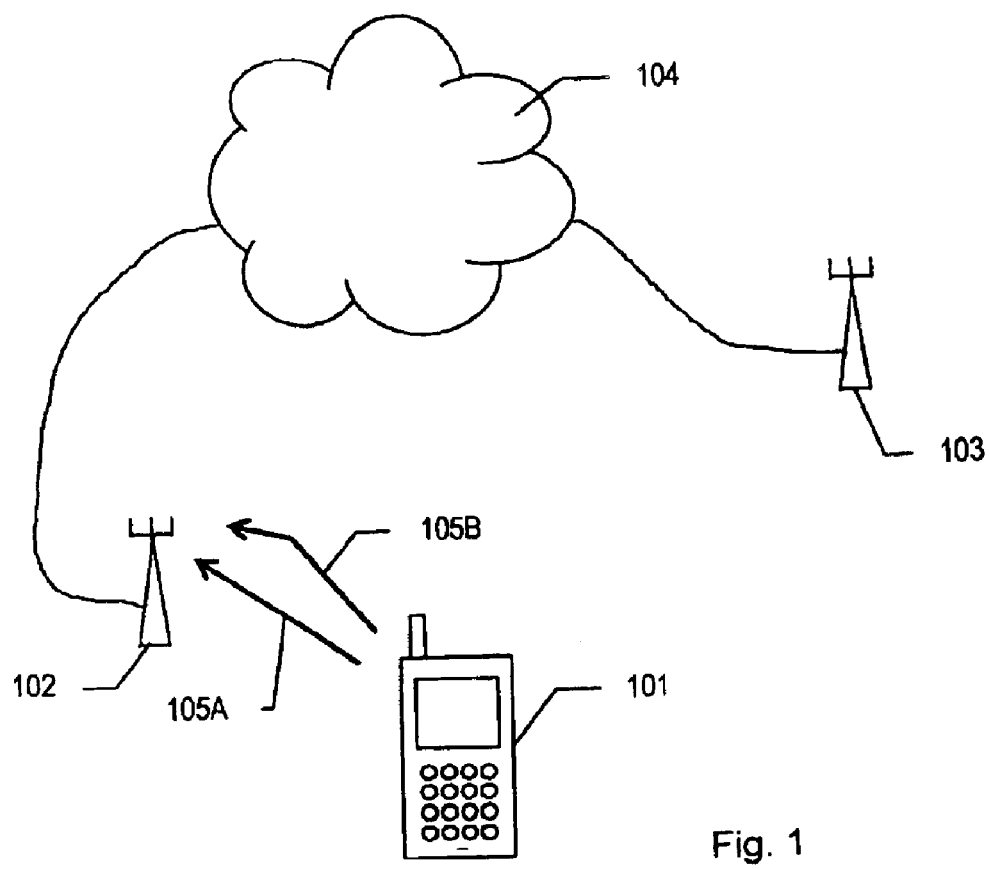
Fig. 1
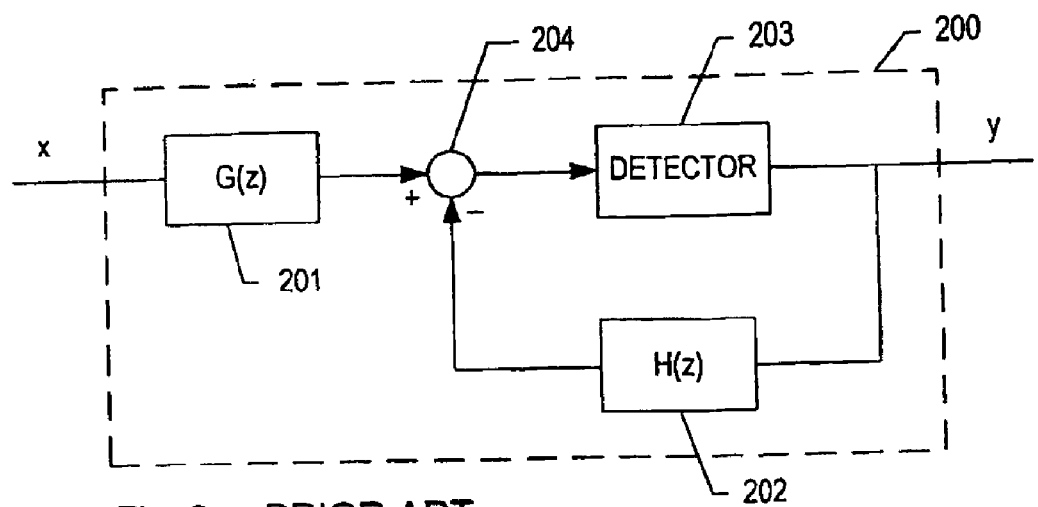
Fig. 2 - PRIOR ART

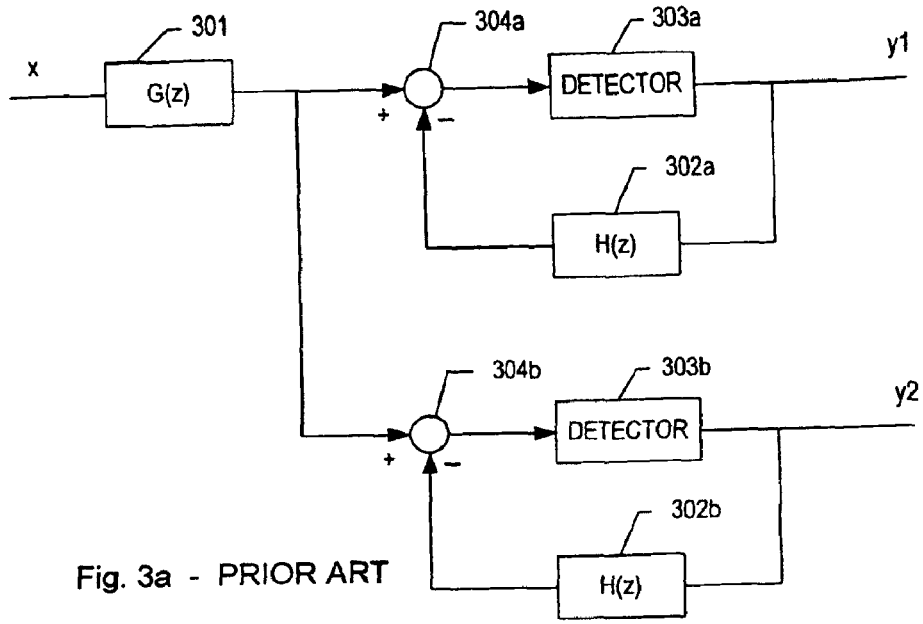
Fig. 3a - PRIOR ART
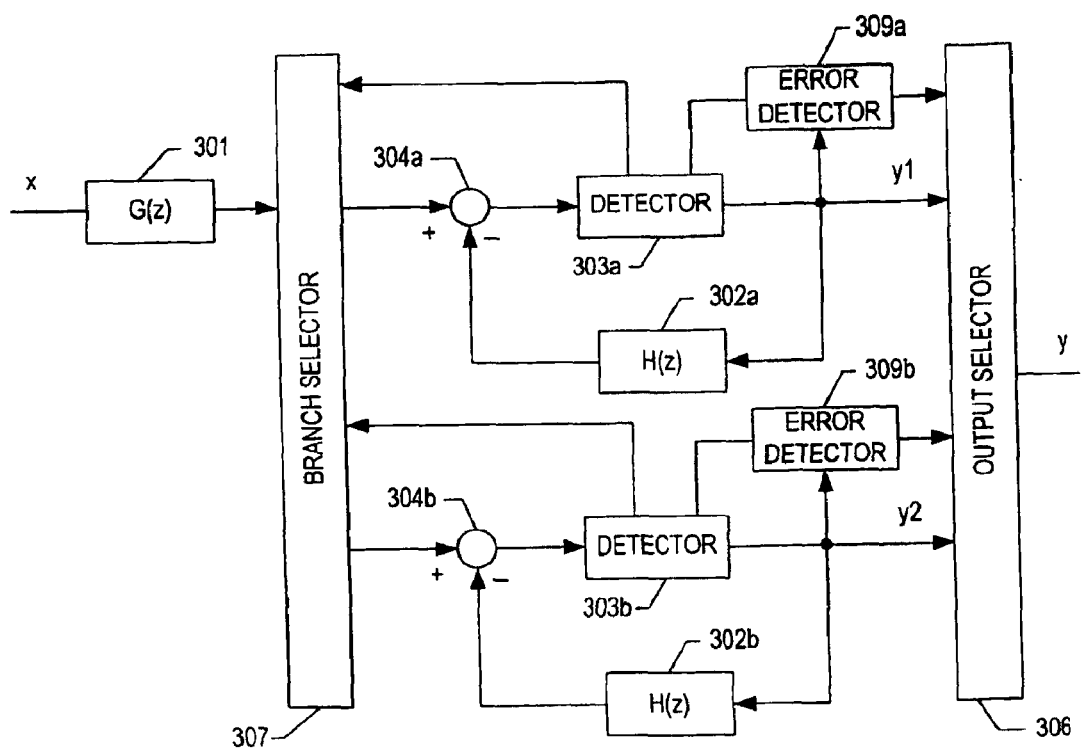
Fig. 3b - PRIOR ART

METHOD OF DETECTING A SEQUENCE OF INFORMATION SYMBOLS, AND A MOBILE STATION ADAPTED TO PERFORMING THE METHOD

BACKGROUND OF THE INVENTION

The invention relates to a method of detecting a sequence of information symbols from a first signal subjected to inter-symbol interference, wherein each symbol can adopt one of a number of different values, said method being performed as one or more signal processing paths, and wherein the following steps are performed repetitively:

setting, in each of said one or more signal processing paths, a symbol in the sequence to a value based on an intermediate signal derived from said first signal and a feedback signal generated on the basis of one or more previously set symbols, dividing a signal processing path, in which said intermediate signal for a given symbol exceeds a given threshold, into two separate signal processing paths, setting said given symbol to different values in each of said two separate signal processing paths, and selecting, after setting a number of symbols, the sequence of information symbols from one of said one or more signal processing paths as the detected sequence of information symbols.

The invention also relates to a mobile station configured to perform the method.

When transmitting a speech signal or a data signal from a first communications device to a second communications device in a radio communications system, such as a mobile telephone communications system, the signal typically propagates along several different paths due to obstacles and reflections. Therefore, the signal arrives at the second communications device as several signal components with different delays. This phenomenon, which is normally called multi-path propagation, which may cause so-called inter-symbol interference or ISI where successive symbols are partly superimposed. This effect is undesirable as it complicates demodulation of the received signal, e.g. in the mobile station. Therefore, different kinds of equalization devices have been used in order to eliminate or reduce inter-symbol interference, e.g. a Maximum-Likelihood Sequence Estimator (MLSE) or Decision-Feedback Equalizer (DFE).

From the prior art, it is also known to perform a detection of a sequence of information symbols from a signal subjected to inter-symbol interference using a so-called parallel decision-feed back equalizer or PDFE. In such an equalizer, which is an example of a detector of the above-mentioned type, information about previously detected symbols is used when detecting new symbols. It is noted that each of the symbols being detected from the signal can adopt one of a number of different values, e.g. the values representing "0" and "1" when the first signal includes information in binary form. Therefore, the task of the detector is to determine which one of the possible values should be selected when generating an output signal or a sequence of information symbols detected.

The detection is performed in one ore more so-called signal processing paths wherein a number of signal processing steps are performed on basis of a given input signal. Due to noise, the decision which value a symbol should be assigned may be difficult to make, i.e. the decision is uncertain, as the distance between the value of the signal to be detected and the possible symbol values exceeds a given threshold. According to the prior art, this problem is solved by splitting the signal processing path into two when an uncertain a decision has been taken.

Normally, in environments where the receiver is subjected to low-level noise, the equalizer may operate by use of a single signal processing path only. As the level of the noise increases, a situation wherein an uncertain decision is taken, i.e. when the distance between the value of the signal to be detected and the nearest symbol value exceeds a given pre-defined threshold, may occur. In order to solve this problem, the signal processing path is split into two, when an uncertain decision has been taken. One path uses the best decision as the symbol, i.e. the nearest symbol value is selected as the symbol value used, and the other signal path uses the second best decision as the symbol.

The detection is now performed as two signal processing paths performed simultaneously. If, an uncertain signal is received in either the first or the second path, then this path is split into two paths, and hereafter three signal processing paths are performed simultaneously. In this way, the signal processing path branches, when needed. When a given number of symbols has been detected, the sequence of symbols from one of the paths is selected to be the detected sequence of symbols, e.g. the sequence having the smallest squared error sum is selected. Hereafter, the scenario may continue or start over again.

According to the prior art, a fixed value is assigned to the above-mentioned threshold, which is optimized to the noise level in the environment in which the apparatus is to be operated. The noise may be of varying natures, e.g. remaining ISI due to a non-ideal ISI-cancelling, noise added by the sender filter, noise added by the receiver filter, and/or additional channel noise of various kinds. This solution may be adequate for many purposes, but when used in a computation limited and/or storage capacity limited apparatus—such as a mobile station—it has the shortcoming of not providing an optimal solution when the noise level is increased. The reason shall be found in the fact that, as a result of the increased noise level, the detector will start new signal processing paths more frequently as more uncertain decision are taken due to the increased noise level. In the situation when all the available signal processing paths are in use, no signal processing paths are available if/when an uncertain decision occurs. When this situation occurs the performance will degrade as uncertain decision are taken—in fact it is not possible to start a new signal processing path even when the degree of uncertainty of the most recently detected symbol is high.

BRIEF SUMMARY OF THE INVENTION

The object of the present invention is to provide an improved method of the above-mentioned type which has a better overall performance, i.e. even when the noise level increases. It is noted that such a solution is of major interest, e.g. in relation to mobile communication, where a first communication device such as a mobile station can be operated in changing environments, e.g. when a mobile station is moved from one location to an other. As a result the situation in which the noise level increases may often occur.

According to the invention, the object is accomplished by a method of the above-mentioned type, where said method further comprises the step of adjusting said given threshold in accordance with an estimate of noise in said intermediate signal.

Hereby, when the noise is increased the threshold is adjusted, i.e. the threshold is moved further into the uncertain area between the possible symbol values in question. The price to pay is that some decisions that were uncertain prior to the adjustment have now become certain decisions. The reward, on the other hand, is that the detector will start new signal processing paths less frequently, as fewer uncertain decision are taken. As a result the signal processing paths can be used when detecting symbols having a higher degree of uncertainty. Hereby, the use of the given limited computational resources and limited storage capacities is optimized, resulting in improved performance.

The invention also relates to a preferred embodiment, wherein said noise is estimated by use of a known sequence of symbols in said first signal.

Hereby, it is possible to perform reliable estimation of the noise using the knowledge of the symbols included in the known sequence of symbols.

In accordance with a particularly expedient embodiment, said method station is so configured that, when said first signal includes a number of blocks of information symbols including a known sequence of symbols, said estimate of said noise is performed continuously.

Hereby, it is possible to perform the adjustment of the threshold frequently which is a point of interest when the level of noise changes continuously. For example, this may be the case as a result of movement of the mobile station, e.g. when using a mobile station in a moving car or the like.

The invention also relates to an embodiment, wherein said noise is estimated as the mean error distance between a known sequence of symbols and the corresponding symbols of said intermediate signal multiplied by a given factor.

Hereby, it is possible to perform an easy and rapid estimation of the noise that requires low computational capacity. Since unnecessary calculations are minimised, computational complexity is reduced which, in turn, reduces the power consumption.

The invention also relates to an embodiment, wherein a given signal processing path is cancelled when the metric thereof is larger than the metric of another given signal processing path, and a given number of corresponding previously set symbols in said given and said another given signal processing are equal.

Hereby, the performance is improved as a result of the liberated computational resources and the increased storage capacity. These resources can be used when a new uncertain decision occurs, which is in contrast to the solutions according to the prior art, in which a situation occurs, wherein the same decisions are taken for all further received symbols in multiple signal processing, e.g. when all the stored previous detected symbols are equal.

Further, the invention relates to a preferred embodiment, wherein a given signal processing path is cancelled when the metric of the given signal processing path exceeds the metric of at least one of all other signal processing paths by a given predefined amount.

Hereby, signal processing paths, which may have large and rapidly increasing metrics, are cancelled. For example, this embodiment of the invention ensures that a signal processing path in which error propagation occurs after one or more previous erroneous decisions have been taken, will not generate a plurality of new signal processing paths. As a consequence, the performance is improved as a result of the liberated computational resources, and the increased storage capacity can be used to handle detected uncertain decisions in other signal processing paths.

The mobile station according to the invention is characterized in that the mobile station comprises adjusting means adapted to adjust the given threshold in accordance with an estimate of the noise.

The advantages mentioned in connection with the corresponding methods according to the invention are achieved hereby.

BRIEF DESCRIPTION OF THE INVENTION

The invention will be explained more fully below in connection with a preferred embodiment and with reference to the drawings, in which:

FIG. 1 illustrates a radio communications system,

FIG. 2 illustrates a decision-feedback equalizer,

FIG. 3a and FIG. 3b illustrate a parallel decision-feedback equalizer according to the prior art.

DETAILED DESCRIPTION OF THE INVENTION

Figure 4:
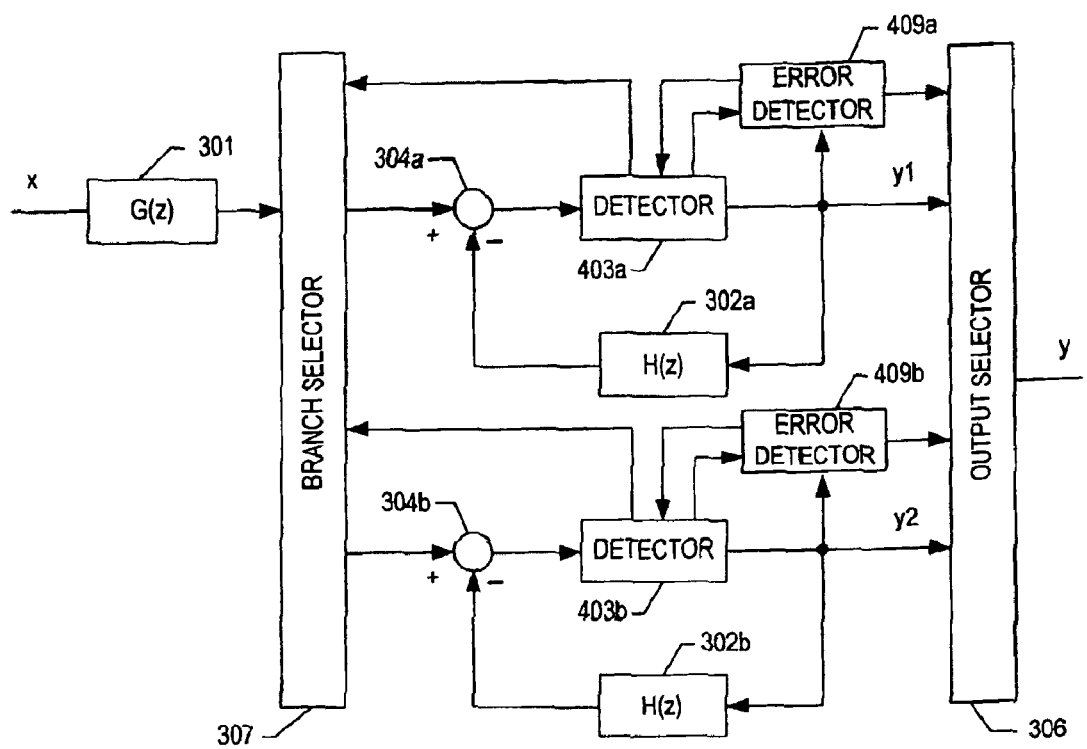
FIG. 4 is a parallel decision-feedback equalizer according to the invention.

The figures are schematic and simplified for clarity, and they show only details that are essential to the understanding of the invention, while other details are omitted. Throughout, the same reference numerals are used for identical or corresponding parts.

FIG. 1 illustrates a cellular communications system as an example of a radio communications system in which radio telephones or mobile stations contain circuitry to permit transmission and reception of modulated signals, thereby permitting two-way communication between the mobile station 101 and remotely located transceivers known as base stations 102, 103. In such systems, the signals to be transmitted are normally produced as a modulation of a carrier signal with the digital symbols to be transmitted via the communications link between a base station 102 and a mobile station 101.

As shown in the figure, in mobile radiophone communications systems, a plurality of base stations 102, 103 are arranged so that each base station covers a respective geographical area called a cell. These cells are grouped to provide a wide area system coverage. A mobile station 101 located in a given cell communicates with the base station therein via a communications link or communications channel. The base stations 102, 103 are usually formed into a regional or national network of telephone switching offices that link the mobile subscribers to the land-based telephone network 104.

In a cellular communications system, or in radio communication systems in general, when transmitting a signal from a first communication device to a second communication device via a communications channel, the signal typically propagates along several different paths due to various obstacles and reflections along the way. As a consequence, the transmitted signal arrives at the second communication device as a number of differently delayed signals. This phenomenon, which is normally called multi-path propagation, may cause inter-symbol interference or ISI, as successive symbols in the signals are partly superimposed. This effect is undesirable as it complicates demodulation of the received signal, e.g. in the mobile station.

It is noted that communications links between first and second communications devices in a radio communications system is normally of varying quality, i.e. the influence of ISI may vary over time.

The multi-path propagation is illustrated in FIG. 1 in which a signal transmitted from the mobile station 101 to the base station 102 propagates along two different paths, i.e. a first path 105A and a second path 105B. Likewise, a signal transmitted from a base station to a mobile station may undergo multi-path propagation but this situation is not illustrated in the figure.

In some cellular communication systems, such as for instance GSM, multi-path propagation is a problem that must be taken care of. The most common way to do so is to use some kind of equalization device in the receiver that takes care of the inter-symbol interference or ISI, introduced in the radio channel; i.e. based on the received signal, detection has to be performed in order to recover the information bits or symbols originally transmitted. For this purpose various kinds of equalization devices may be used, e.g. a Maximum-Likelihood Sequence Estimator or MLSE which is the optimal solution in case of additional white Gaussian noise or AWGN. However, a MLSE or Viterbi decoder is often too complex for practical use. Therefore, approximations of the optimal equalizer are often used.

Often, an equalization device called a Decision Feedback Equalizer or DFE, is a good choice when making a trade-off between performance and complexity. The DFE determines the received symbols and feeds back the information to cancel ISI. An example of a DFE is given in FIG. 2 and the corresponding description.

Often, when transmitting digital information from a first communications device to a second communications device, the information is transmitted as blocks of information bits. For example, in Time Division Multiple Access or TDMA systems, a number of digital signals are interleaved into one single high-speed channel, i.e. the channel consists of a number of sub-channels servicing a number of communications devices instead of one. Therefore, when transmitting information to a given communications device, the information is transmitted as bursts or blocks of information bits. In TDMA systems the communication is performed during continuously repeated intervals of time or so-called time slots in which two devices are able to interconnect, i.e. blocks of information bits are transmitted there between at a given rate.

In the pan-European mobile communications system GSM, a pre-known training sequence is included in a signal to be transmitted. As mentioned above, when transmitting digital information from a first communications device to a second communications device, the information is transmitted as blocks of digital information or so-called bursts, and the GSM system is adapted to include a pre-known training sequence in each burst, i.e. each burst includes a pre-defined sequence of bits or symbols.

Figure 5:
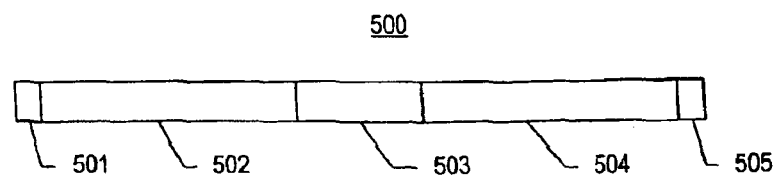
FIG. 5 shows a block of information to be transmitted in a TDMA system.

FIG. 5 shows a normal burst to be transmitted in a global system for mobile communications or GSM system. The burst 500 includes two 58-bit information sequences 502, 504, and a training sequence 503 located there between. As illustrated in the figure, the burst 500 also includes a 3-bit starting sequence 501 and a 3-bit ending sequence 505 that are located at the beginning and the trailing end of the burst 500, respectively. The training sequence 503 includes a pre-known sequence of 26 bits. As described in more details in the following, the pre-known training sequence is used in accordance with the invention.

FIG. 2 shows a block diagram of a decision-feedback equalizer 200 according to the prior art. A decision-feedback equalizer or DFE is a non-linear equalizer that employs previous decisions to eliminate the inter-symbol interference or ISI on the current symbol or bit to be detected caused by previously detected symbols. The DFE 200 includes two filters, a first filter or a feedforward filter 201, and a second filter or a feedback filter 202. The feedforward and feedback filters are denoted G(z) and H(z), respectively. As illustrated in the figure, the DFE 200 also includes a symbol-by-symbol detector or setting means 203 and a summation point 204.

The DFE 200 is adapted to receive an input signal via an input terminal, which is connected as an input terminal of the feedforward filter 201. An output terminal of the feedforward filter 201 is connected to an input terminal of the detector 203 via a summation point 204. The detector 203 includes an output terminal, which forms an output terminal of the DFE 200, and which is also connected to the input terminal of the feedback filter 202. The output of the feedback filter 202 is connected to the summation point 204 via a negative input terminal.

The input terminal of the DFE 200 may be connected to a receiver, not shown in the figure, which is adapted to receive a signal via a communication link such as a radio channel. The input signal to the DFE 200 includes a number of data symbols or bits, and additional noise. For example, the input signal exhibits inter-symbol interference or ISI.

The DFE 200 is adapted to detect the data symbols or bits included in the input signal. The feedforward filter 201, which can be implemented as a Finite Impulse Response filter or FIR filter, is adapted to suppress pre-cursive ISI and out of band noise. The feedback filter 202 is adapted to suppress the post-cursive ISI, which would otherwise interfere with the detection of later bits. The suppression performed by the feedback filter 202 is based on previous output data symbols or decisions of the detector 203, i.e. previous decisions are convoluted with the feedback filter in order to form the signal fed to the summation point 204. In the summation point 204 the output signal of the feedback filter 202 is subtracted from the output signal from the feedforward filter 201 in order to cancel trailing ISI. It is noted that the construction of a feedforward filter 201 and a feedback filter 202 is of minor interest in relation to the present invention, and as it is known from the prior art, it will not be described in the following.

The detector 203 may be of various types, depending on the modulation type. When the filters 201, 202 remove the ISI, the signal at the input of the detector 203 is free from ISI, and hereby the symbols in the received signal are detected. But, when the signal fed to the detector 203 includes noise, this noise may cause an erroneous decision, which is fed to the feedback filter 202, and the ISI cancellation will be incorrect and future detection may be affected. This phenomenon, where a single error causes multiple errors, is known as error propagation and is a major drawback of the DFE. Even though the error propagation has been shown to have a relatively small effect on the bit error rate of the detector 203, error propagation is undesirable as it may cause error bursts, which e.g. can overwhelm error correction codes and hereby result in a severe degradation of the overall system performance.

A conventional DFE can only consider a single possible data sequence. On the other hand, a structure called a parallel decision-feedback equalizer or PDFE is able to follow several possible sequences, and, based thereon, to select the most probable one after a short delay. This will be explained more detailed in the following.

FIGS. 3a and 3b illustrate an example of a parallel decision-feedback equalizer or PDFE according to the prior art. In general a PDFE includes a number of decision-feedback equalizers, which, as the name indicates, are placed in parallel. In the shown example the PDFE includes two decision-feedback equalizers. Hereby, the symbols included in the input signal can be estimated in a number of decision-feedback equalizers or paths simultaneously, i.e. a number of signal processing paths may be performed, and the output signal found to be best can be selected to be the detected signal. As described in further detail in the following, a PDFE is advantageous when a symbol detection is difficult to perform, e.g. due to a high noise level.

FIG. 3a illustrates the overall principle of a typical PDFE, wherein an input signal x is fed to both branches in the equalizer. In the shown example, the feedforward filter 301 is used in both branches, i.e. the input signal x is fed to a single feedforward filter 301, and the output of the feedforward filter 301 is fed to the two branches, i.e. the output of the feedforward filter 301 is fed to both summation points 304a, 304b. As illustrated in the figure, a first branch includes the summation point 304a, a feedback filter 302a and a detector or setting means 303a. Likewise, a second branch includes the summation point 304b, a feedback filter 302b and a detector or setting means 303b. The function of each of the two branches is as described in relation to FIG. 2, and therefore, the following description will focus on the difference in operation between a DFE and a PDFE.

It is noted that the functions of the two branches in FIG. 3a are identical, and as a consequence, the generated values of output signal y1 and output signal y2 will be equal when the previous values of the output signals y1, y2 are equal. But, by manipulating the output signals, e.g. by changing the most recent symbol of y2 to a value different from the latest value of y1, the following symbols estimated in the two braches may be different, as a result of the feedback loop. This effect is used in the PDFE when detecting the symbols in an input signal x.

FIG. 3b is an example of a PDFE according to the prior art, giving more details than FIG. 3a. As illustrated, the equalizer includes an output selection means 306 having the output of the detectors 303a, 303b connected thereto. The output selection means 306 includes memory means adapted to store a number symbols previously detected in the first branch and in the second branch.

As illustrated in the figure, the detectors 303a, 303b are connected to a branch selection means or dividing means 307, which is adapted to start a new signal processing path when instructed to-by the detector 303a, 303b. The first branch includes an error detection means 309a, which is connected to the detector 303a, to the first output signal y1, and to the output selection means 306. Likewise, the second branch includes an error detection means 309b, which is connected to the detector 303b, to the first output signal y2, and to the output selection means 306.

Normally, in environments where the receiver faces low-noise, the PDFE operates like a single DFE. As the noise level increases, i.e. when the distance between the received signal point and the nearest signal point in the signal constellation is larger than a defined threshold a, this path flags for an unsure decision. An unsure decision is detected by the detection means in the path in question, e.g. an unsure decision in the first path is detected by the detector 303a, which is adapted to inform the branch selection means 307 via the above-mentioned connection there between.

When an unsure decision is flagged, the path is split into two paths, one with the best decision as the first decision and the other with the second best. The PDFE now follows two paths in the trellis simultaneously. Preferably, the previous decisions from the first signal processing path is copied to the newly started signal processing path.

If an uncertain signal is received in either the first or the second path, while the PDFE is following these two paths, the path in question is split into two paths. The PDFE now follows three paths simultaneously. It is noted that the PDFE illustrated in FIGS. 3a and 3b includes two branches only, and therefore a maximum of two simultaneous signal processing paths can be performed. But, in practice a larger number (N) of branches will often be included. Hereby, the PDFE can follow up to N paths in the trellis. The PDFE continues branching in this fashion until all the NDFEs are utilized or for a given specified number of symbols, whichever occurs first.

When the specified number of symbols have been set or detected samples the data stored in the feedback filter and in the delay elements of the path with the smallest squared error sum is selected, this selection is performed by the output selection means 306 using the squared error sums of the different signal processing paths computed by the error detection means 309a, 309b.

The detector according to the prior art have the following disadvantage. Threshold specifying when to start a new signal processing path is fixed and optimised for a specific noise level. When the noise increases, the detector will start new signal processing paths as soon as a signal processing path is available, i.e. new processing paths are started on the run whenever needed. When all signal processing paths are in use, no paths are available if an additional splitting is desirable. In this case it is not possible to split, even if an uncertain decision is taken, and performance will degrade.

FIG. 4 is an example of a parallel decision-feedback equalizer (PDFE) according to the invention.

According to the invention, the above-mentioned threshold is adjusted in accordance with an estimate of said noise. In a preferred embodiment, the noise is estimated by use of a known sequence of symbols in said first signal. For example, when the first signal includes a number of blocks of information symbols including a known sequence of symbols, the estimate of said noise may be performed continuously. For example, when receiving a signal in a receiver in a GSM system, each burst typically includes a so-called training sequence, which is a pre-known sequence of information symbols or bits. Therefore, the threshold can be calculated burstwise, e.g. as the mean error distance between the pre-known symbols in the training sequence, and the received versions of the symbols in the training sequence, multiplied by a factor. Introducing this solution to the first shortcoming improves the performance.

Furthermore, as described in the following, new signal processing paths are started on the run, and, in order to increase performance, paths are also cancelled on the run, when some given conditions are fulfilled.

The error detection means 409a and the error detection means 409b are connected to the detector or setting means 403a, and to the detector or setting means 403b, respectively, in the shown example of a detector according to the invention. The error detection means 409a, 409b are adapted to operate like the error detection means 309a, 309b but, and additionally to determine noise in the signal fed to the detectors 403a, 403b as the mean error distance between the pre-known symbols in the training sequence, and the received versions of the symbols in the training sequence, multiplied by a given factor. As a result the threshold is adjusted via the connection between the error correction means 409*a*, 409*b* and the detectors 403*a*, 403*b*. The adjustment may advantageously be performed by adjusting means located in said detection means.

A shortcoming of a detector according to the prior art is the path splitting in the erasure zone. When the PDFE starts to follow two paths, at least one of the decisions is an erroneous decision. Because of error propagation, the decisions following the erroneous decision in this path will be classified as unsure decisions and new DFEs will be started as long as there is a DFE available. These DFEs follow paths with erroneous decisions, have large, fast increasing metric, and are never selected at the end of the erasure zone. After a few steps all of the DFEs in the PDFE are in use. This prevents the existing paths from splitting, even if an uncertain decision is taken, and performance will degrade, both in bit error rate and in number of calculations.

To overcome this shortcoming of the prior art, paths with rapidly increasing metric are cancelled in accordance with the invention. If the metric of a path is larger than the sum of the metric of the path with least metric and the noise estimate multiplied by a factor, this path is cancelled. This improves the performance, the number of calculations is reduced, and the bit error rate decreases.

Another shortcoming of the prior art is that there is no cancellation of paths with the same most recent symbol decisions. If the most recent symbol decisions are as many as the channel memory, i.e. the channel specific memory means included in the selection means 306, these paths will make the same decisions for all future received symbols. The path with least metric will continue to have the least metric. The other path should be cancelled to make the DFE available to other paths.

To overcome this shortcoming of the prior art, paths with the same most recent symbol decisions are cancelled according to the invention. If two paths are equal for the most recent decisions, as many as the channel memory, the path with least metric survives and the other one is cancelled. This improves the performance. Further, a given signal processing path is cancelled, when the metric of the signal processing path in question is much larger than for the path with least metric.

Some preferred embodiments have been shown in the foregoing, but it should be stressed that the invention is not limited to these, but may be embodied in other ways within the scope of the subject-matter defined in the following claims. In addition, the invention is not limited to this specific definition of the noise estimate used in order to adjust to above-mentioned threshold, but any parameter describing the reception quality, i.e. the quality of the received signal, may be used. Furthermore, a detector or equalizer according to the invention may include an arbitrary number of decision-feedback equalizers, and may both be implemented in hardware and/or in software, e.g. by programming dedicated hardware to perform the required signal processing. Furthermore, the adjustment of the thresholds in the different signal processing paths can be performed so that the thresholds are given the same value; and an initial signal processing may be performed in order to generate a pre-processed signal prior the performing the method according to the invention. Additionally, it is noted that the thresholds indicating whether a decision of the value of a received signal or intermediate signal is certain or uncertain do not have to be of equal value for the different symbols.

What is claimed is:

1. A method of detecting a sequence of information symbols from a first signal subjected to inter-symbol interference, wherein each symbol of the sequence of information symbols can adopt one of a plurality of different values, said method being performed as at least one signal processing path, the method comprising:
    setting, in each of said at least one signal processing path, a symbol in the sequence of information symbols to a value based on an intermediate signal derived from said first signal and a feedback signal generated on the basis of one or more previously set symbols;
    dividing a signal processing path, in which said intermediate signal for a given symbol exceeds a given threshold, into two separate signal processing paths, setting said given symbol to different values in each of said two separate signal processing paths;
    selecting, after setting at least one symbol, the sequence of information symbols from one of said at least one signal processing path as a detected sequence of information symbols; and
    adjusting said given threshold in accordance with an estimate of noise in said intermediate signal.

2. A method according to claim 1, wherein said noise is estimated by use of a known sequence of symbols in said first signal.

3. A method according to claim 2, wherein, when said first signal includes a number of blocks of information symbols including the known sequence of symbols, said estimate of said noise is performed continuously.

4. A method according to claim 2 or 3, wherein said noise is estimated as a mean error distance between said known sequence of symbols and corresponding symbols of said intermediate signal multiplied by a given factor.

5. A method according to any one of claims 1–3, wherein a given signal processing path is canceled when a first metric thereof is larger than a metric of a second given signal processing path and a given number of corresponding previously set symbols in said given signal processing path and said second given signal processing path are equal.

6. A method according to any one of claims 1–3, wherein a given signal processing path is canceled when a first metric of the given signal processing path exceeds a metric of a second given signal processing path by a given predefined amount.

7. A mobile station adapted to detect a sequence of information symbols from a first signal subjected to inter-symbol interference, wherein each symbol of said sequence of information symbols can adopt one of a plurality of different values, said mobile station adapted to detect at least one signal processing path, said mobile station comprising:
    setting means adapted to set, in each of said at least one signal processing path, each symbol in the sequence to a value based on an intermediate signal derived from said first signal and a feedback signal generated on the basis of one or more previously set symbols;
    dividing means adapted to divide a signal processing path, in which said intermediate signal for a given symbol exceeds a given threshold, into two separate signal processing paths, whereby said given symbol is set to different values in each of said two separate signal processing paths;
    selecting means adapted to select, after setting at least one symbol, the sequence of information symbols from one of said at least one signal processing path as a detected sequence of information symbols; and
    adjusting means adapted to adjust said given threshold in accordance with an estimate of noise in said intermediate signal.

8. A mobile station according to claim 7, wherein said adjusting means is adapted to estimate said noise using a known sequence of symbols in said first signal.

9. A mobile station according to claim 8, wherein when said first signal includes a number of blocks of information symbols including said known sequence of symbols, said adjusting means being adapted to perform estimation of said noise continuously.

10. A mobile station according to claim 8 or 9, wherein said adjusting means is adapted to estimate said noise as a mean error distance between said known sequence of symbols and corresponding symbols of said intermediate signal multiplied by a given factor.

11. A mobile station according to any one of claims 7–9, wherein said selecting means is further adapted to cancel a given signal processing path, when a metric thereof is larger than a metric of a second given signal processing path, and a given number of corresponding previously set symbols in said given signal processing path and said second given signal processing path are equal.

12. A mobile station according to any one of claims 7–9, wherein said selecting means is further adapted to cancel a given signal processing path when a metric of the given signal processing path exceeds a metric of a second given signal processing path by a given predefined amount.

* * * * *